(12) United States Patent
Squire et al.

(10) Patent No.: US 7,441,367 B2
(45) Date of Patent: Oct. 28, 2008

(54) ROBOTIC PEST REMOVAL SYSTEM

(75) Inventors: James C. Squire, Buena Vista, VA (US); David L. Livingston, Buchanan, VA (US); Daniel E Sonenshine, Norfolk, VA (US); Dennis J. Crump, Oakton, VA (US); Glenn B. Hammond, Roanoke, VA (US); Justin H. Woulfe, Maurertown, VA (US); Gerald Allen Sullivan, Jr., Lexington, VA (US)

(73) Assignee: VMI Foundation, Lexington, VA (US)

( * ) Notice: Subject to any disclaimer, the term of this patent is extended or adjusted under 35 U.S.C. 154(b) by 0 days.

(21) Appl. No.: 11/374,440

(22) Filed: Mar. 13, 2006

(65) Prior Publication Data

US 2006/0204531 A1  Sep. 14, 2006

Related U.S. Application Data

(60) Provisional application No. 60/661,451, filed on Mar. 14, 2005.

(51) Int. Cl.
 *A01M 5/00* (2006.01)
(52) U.S. Cl. .................................................. 43/132.1
(58) Field of Classification Search .................. 43/132.1
 See application file for complete search history.

(56) References Cited

U.S. PATENT DOCUMENTS

| | | | |
|---|---|---|---|
| 4,742,641 A * | 5/1988 | Cretti ......................... 43/132.1 |
| 4,884,361 A | 12/1989 | Sonenshine et al. |
| 5,296,227 A | 3/1994 | Norval et al. |
| 5,357,902 A | 10/1994 | Norval et al. |
| 5,465,525 A * | 11/1995 | Mifune et al. ............... 43/132.1 |
| 5,974,726 A | 11/1999 | Creeger et al. |
| 6,055,766 A | 5/2000 | Nolen et al. |
| 6,079,150 A * | 6/2000 | Setikas et al. ............... 43/132.1 |
| 6,088,949 A | 7/2000 | Nicosia et al. |
| 6,272,790 B1 | 8/2001 | Paganessi et al. |
| 6,286,249 B1 | 9/2001 | Miller et al. |
| 6,331,297 B1 | 12/2001 | Allan et al. |
| 6,338,013 B1 * | 1/2002 | Ruffner ........................ 701/23 |
| 6,459,955 B1 * | 10/2002 | Bartsch et al. ............... 700/245 |
| 6,530,172 B2 | 3/2003 | Lenz |
| 6,581,324 B1 | 6/2003 | Creeger et al. |
| 6,611,738 B2 | 8/2003 | Ruffner |
| 6,631,583 B2 * | 10/2003 | Rollins ........................ 43/124 |
| 6,675,528 B2 | 1/2004 | Jablin |
| 6,688,255 B2 | 2/2004 | Donaldson et al. |
| 6,718,687 B2 | 4/2004 | Robison |
| 6,800,279 B2 | 10/2004 | Bernier et al. |
| 6,842,674 B2 | 1/2005 | Solomon |
| 6,845,297 B2 | 1/2005 | Allard |
| 6,850,024 B2 | 2/2005 | Peless et al. |
| 6,850,818 B2 | 2/2005 | Sabe et al. |
| 6,853,880 B2 | 2/2005 | Sakagami et al. |
| 2006/0261188 A1 * | 11/2006 | Ito et al. ...................... 239/306 |

* cited by examiner

*Primary Examiner*—Kurt Rowan
(74) *Attorney, Agent, or Firm*—Saliwanchik, Lloyd & Saliwanchik

(57) ABSTRACT

An autonomous robotic system and method for removing pests from a specific location. The robotic system of the invention preferably comprises a means for attracting pests to at least one specific location; and a robotic means for collecting and/or exterminating pests attracted to the specified location. In certain embodiments, the robotic means comprises a mobile robot and a means for navigating the robotic means. In operation, pests are attracted to at least one location by an attracting means, and these pests are then collected and/or exterminated by a mobile, autonomous robot of the invention.

11 Claims, 1 Drawing Sheet

ROBOTIC PEST REMOVAL SYSTEM

CROSS-REFERENCE TO RELATED APPLICATION

This application claims the benefit of provisional patent application Ser. No. 60/661,451, filed Mar. 14, 2005, which is hereby incorporated by reference in its entirety, including all figures, tables, and drawings.

BACKGROUND OF THE INVENTION

Ticks, biting flies, spiders, mites, and chiggers are examples of arthropods that pierce the skin of humans and animals, causing damage to skin, blood loss, and irritation, as well as transmission of deadly infectious diseases. These factors contribute to the enormous economic losses sustained by the livestock industry. Losses in livestock production (cattle, sheep, swine, and poultry) in the U.S. due to arthropod pests were estimated at more than $3 billion. This figure does not include the cost of pest control or losses to the equine industry (see Drummond, R O et al., *Control of Arthropod Pests of Livestock: A Review of Technology*, CRC Press, Inc., Boca Raton, Fla., 245 pp. (1988)). Although precise figures for most countries are lacking, estimates of world-wide economic losses due to ticks and tick-borne diseases alone are in the billions of dollars.

Ticks are obligate parasites of vertebrates, feeding exclusively on blood. Most tick species have a simple life cycle with three active stages, larva, nymph and adult. All three must seek out a vertebrate animal for their meal, feed, drop off, molt to the next stage, and begin the process over again. Thus, each life stage must crawl up and through vegetation where host animals are present, cling to these animals and suck blood. Blood feeding occurs over a period of several days. The remainder of the life cycle is spent in the soil and vegetation, either in development or waiting for hosts.

Removal of pest infestations in a specific area is a formidable task. Thus, it is not surprising that no single, universally accepted method is available for this purpose. It is well established that certain chemicals, such as pheromones, can be used to attract pests to an area for elimination. Allan and Sonenshine, for instance, teach of several tick-specific pheromones in U.S. Pat. No. 6,331,297, and Bernier teaches of numerous general chemoattractants for arthropods in U.S. Pat. No. 6,800,279.

One use for these chemoattractants is to localize arthropod pests and other common pests with the intent of killing or removing them mechanically. Lenz teaches in U.S. Pat. No. 6,530,172, for instance, how to use $CO_2$ as a chemoattractant for Diptera (such as mosquitoes and flies), an idea developed by Jablin (U.S. Pat. No. 6,675,528) to attract and incinerate them. Robinson (U.S. Pat. No. 6,718,687) developed a similar method to remove Diptera from an area, but used lactic acid as the chemoattractant and an electric fan as the killing mechanism.

With the aforementioned mechanical methods for elimination, the target pest is attracted to the vicinity of the pheromone source and is expected to become entangled in an adhesive or caught in a container. Such traps may not be effective for all pest species, especially in those cases where additional chemical or physical stimuli are necessary to induce mating. Further, pheromones (or chemoattractants) work only over a limited region (e.g., ticks are attracted over about a 15 foot radius to a point source of $CO_2$ being released at human respiratory rates), so to reduce a species population over an area such as a typical residential or agricultural property requires many chemoattractant sources and requires them to be regularly replenished.

The use of pesticides as a method to kill arthropods that have been attracted to an area has several advantages over the mechanical killing mechanisms described above. Pesticides are robust, do not require external power, and may be cheaper to implement. Norval, for instance, describes a chemoattractant-emitting decoy containing an acaricide (U.S. Pat. No. 5,296,227) to destroy ticks, as does Sonenshine (U.S. Pat. No. 4,884,361). One interesting variation of this idea is described by Norval and Sonenshine in U.S. Pat. No. 5,357,902, in which feed is used to attract a host to a specific area, where the host is passively brushed with a suitable pesticide for eliminating ticks. Where there are multiple chemoattractant sites, either multiple reservoirs of pesticide or widespread pesticide spraying is required. Unfortunately, widespread pesticide spraying operations can pose environmental hazards for the surrounding area as well as health hazards for individuals working near the spraying facility. Further, certain pesticides may cause contamination of the host with toxic chemicals.

Robots have also been used in methods to reduce pest populations. Donaldson (U.S. Pat. No. 6,688,255) teaches a robot that can pick up insects such as fruit flies and transfer them to a holding container. Ruffner (U.S. Pat. Nos. 6,338,013 and 6,611,738) describes a multifunctional robot that can clean, mow lawns, or spray a pesticide, using GPS or radio navigational beacons to remain within a defined area. Unfortunately, because the pesticide is not directed specifically at the pest by the robot, host animals or individuals may be contaminated by the toxic materials.

One novel application of robots for targeted arthropod control is the development of a non-mobile micro machine that the pest transports to its nest, where it releases a pesticide (Creeger, U.S. Pat. No. 5,974,726), sends a locating beacon, or violently explodes (Creeger, U.S. Pat. No. 6,581,324). Unfortunately, this method would not be effective in the reduction of populations of many pests because few pests would carry the machine to their nests.

Accordingly, there is a need for an effective system and method for controlling populations of pests. In particular, a need exists for a way to more accurately target pests for extermination or capture, without adversely affecting the surrounding environment.

BRIEF SUMMARY OF THE INVENTION

The subject invention provides systems and methods for controlling pest populations. The systems and methods uniquely combine a means for attracting pests to a specific location with a robotic means for collecting and/or exterminating pests attracted to the specified location.

In one embodiment of the invention, the attracting means is a pest attractant line that runs around the perimeter of a specific area and the robotic means is a mobile, autonomous robot that patrols the area around the attractant line. In a preferred embodiment, the attractant line releases a chemoattractant into the environment. Chemoattractant is circulated through the attractant line from a chemoattractant dispenser (such as a tank) that is attached to the line, where the dispenser can be easily refilled. The attractant line is preferably a flexible tube with multiple holes to perfuse the chemoattractant over a wide, but defined, area.

The function of the mobile robot is to collect and/or exterminate pests. In a preferred embodiment, the mobile robot of the invention collects ticks and exposes the collected ticks to pesticide for a sufficient period to exterminate them. By utilizing this method, exposure of humans and animals—other than pests—to pesticide is greatly reduced as compared to indiscriminant spraying.

The mobile, autonomous robot dispenses a pesticide directly to an area and/or is covered with a material engineered to attract and/or entangle the targeted pest for future extermination. In a related embodiment, material covering the robot can be infused with pesticide to immediately exterminate collected pests. In other embodiments, the mobile robot of the invention collects the pests, either actively using moving effectors or passively by being covered in a material that causes the pests, such as ticks, to attach thereto. The collected pests may then be later exterminated at an extermination station. This approach further eliminates the danger of accidental human or pet ingestion of pesticides.

In certain embodiments, the robotic means comprises means for controlling the navigation. For example, one embodiment of the invention includes an embedded wire to broadcast a magnetic signal for mobile robot navigational purposes.

The subject invention contemplates controlling pest populations in multiple areas. Multiple attracting means are situated in specific locations of interest. An autonomous, mobile robot is used to automatically traverse the specified attractant distribution points.

It is an object of the invention to provide the user with control over the area to be treated in accordance with the subject invention. In a related embodiment, the user has control over the area traversed by the robot to ensure that the pests will be attracted to the same path.

DETAILED DISCLOSURE OF THE INVENTION

Figure 1:
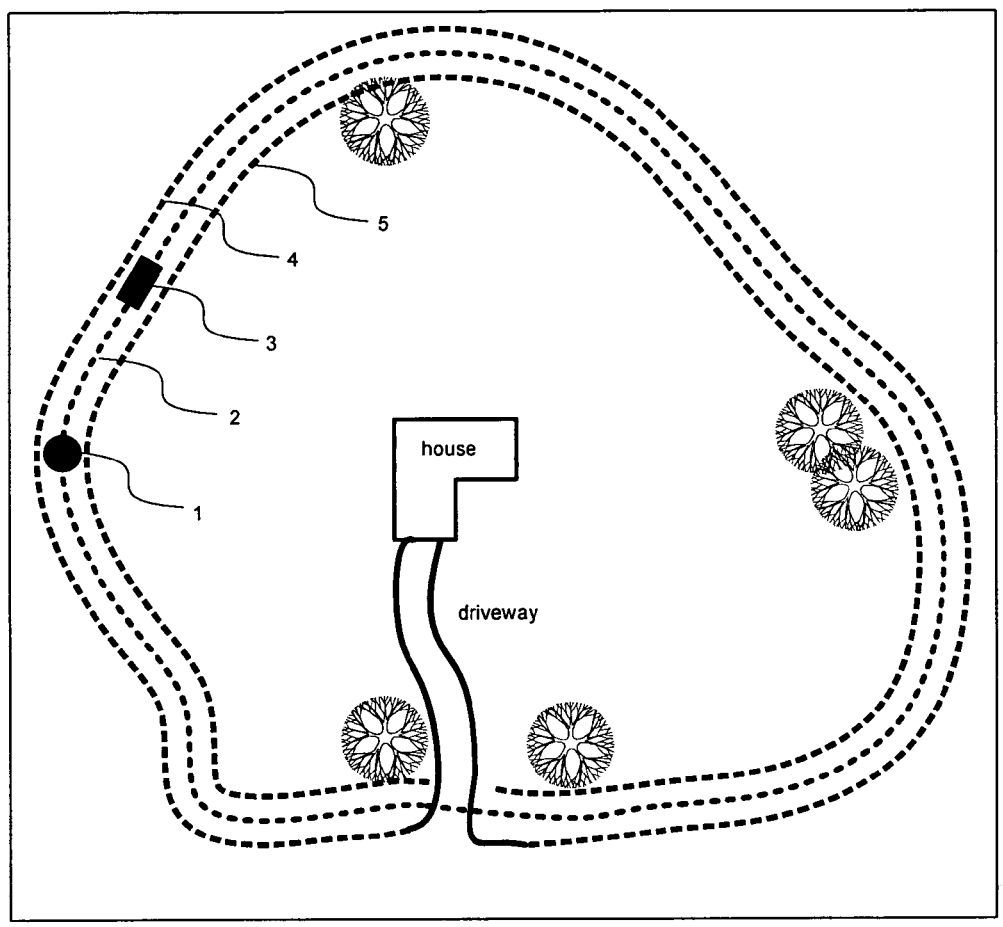
FIG. 1 shows a tick extermination system of the invention.

The subject invention provides systems and methods for pest population control. Specifically exemplified herein is a system comprising a means for attracting pests to a specific location; and a robotic means for collecting and/or exterminating the pests attracted to the specified location.

One embodiment of the invention comprises an attractant line that dispenses pest chemoattractant; and a robotic means comprising an autonomous, mobile robot and a means for navigating the robot. The use of such a system makes it possible to use pesticides in a highly selective and efficient manner, thereby reducing exposure of the environment and individuals/hosts to pesticides.

As used herein, the term "pest" includes, for example certain members of the phyla Arthropoda and Nematoda. Examples of pest populations controlled by the subject invention include, but are not limited to, the following: *Heterorhabditis megidis; Heterorhabditis bacteriophora; Steinernema scapterisci; Steinernema riobravis; Steinernema feltiae; Steinernema carpocapsae*; mites (Acari); spiders (Acarina); millipedes (Diplopoda); centipedes (Chilopoda); lice (Anoplura); wood lice (Isopoda); mosquitoes (Culicidae); blackflies (Simuliidae); sand flies (Phlebotominae); biting midges (Ceratopogonidae); horseflies (Tabanidae); termites (Isoptera); tsetse flies (Glossinidae); stable flies and house flies (Muscidae); fleas (Siphonaptera); triatomine bugs (Triatominae); soft ticks (Argasidae); and hard ticks (Ixodidae).

In accordance with the present invention, a preferred system of the invention comprises an attractant line, a chemoattractant dispenser, a mobile robot, and a means for navigating the robot. In a preferred embodiment, the system of the invention is designed to remove ticks from a residential property. One skilled in the art will recognize that the subject system can be adapted to remove other pests from other areas.

In one embodiment, the robotic system of the invention consists of three subsystems (FIG. 1): a stationary service station 1, a stationary attractant line 2, and an autonomous mobile robot 3 for tick collection and/or pesticide delivery. Use of the system comprises programming the robot to deliver pesticide and/or collect pests.

The system preferably enables extermination of pests within a localized area such as the edge of paths or lawns (or, as illustrated in FIG. 1, within boundaries delineated as 4 and 5). Also, the system of the invention prevents pest entry into a specified area.

Preferably, the action of the system is repeated cyclically, each repetition denoted as a pest-extermination cycle. In one embodiment, the pest-extermination cycle is composed of two parts: the collection/pesticide-delivery cycle and the service cycle. The collection/pesticide-delivery cycle occurs while the robot traverses the area to be treated (such as along a chemoattractant line or a designated navigation area). The service cycle occurs in the service station.

Robotic Means

According to the subject invention, the robotic means comprises a mobile, autonomous robot. The mobile robot of the invention operates in a limited or an unlimited workspace and is capable of freely moving along a predetermined path, or without a particular path, and performs a predetermined function (such as collecting and/or exterminating pests). In certain embodiments, the mobile robot of the invention is capable of recognizing information of external environment and reflecting the information on its own behavior. For example, the robot can determine its behavior by changing action model based on input information such as sound, image, and sense of touch.

The mobile robot of the invention can be selected from a variety of robotic apparatuses that have been developed for use in performing various tasks. For example, the mobile, autonomous robot of the subject invention can be based on those described in U.S. Pat. Nos. 6,853,880; 6,850,818; 6,850,024; 6,845,297; and 6,842,674; all of which are hereby incorporated in their entirety by reference.

The robotic means of the invention can further include means for controlling mobile robot navigation. Examples of navigation means include, but are not limited to, use of global positioning system (GPS); use of predefined paths created using wires (such as those that can communicate an electronic or magnetic signal to the path to be traversed) or rails (on which a mobile robot can move along); use of metal irrigation pipes; use of navigation signs, positioned within the area in which the mobile robot moves, where the navigation signs act as "stations" which redefine the exact position of the robot, and from which the program may direct the robot to the next station; use of boundaries recognizable by the robot, which permits the mobile robot to effect random traversal therein; and via programming the robot with a blueprint of its designated area of operation, such as a map of the residential area for pest extermination.

One embodiment of the mobile robot comprises a four-wheeled, mobile device actuated by permanent-magnet, dc electric motors. The robot's power supply consists of rechargeable batteries and a high-efficiency buck-boost converter to supply power to the electronic subsystems. An embedded microcontroller directs all operation of the robot. Sensors are used to detect the navigation signal provided by the attractant/navigation tube, obstacles to path traversal, and charging electrodes in the service station. The physical structure of a mobile robot can be covered by, for example, a fiberglass/plastic shell. In certain embodiments, as described herein, the robotic shell is covered by a heavy cloth that provides a good medium for pest, especially tick, adherence. In certain embodiments, the mobile robot comprises visible indicators for displaying the system state.

In certain embodiments, the robotic means of the invention includes a safety means to ensure safe operation of the mobile robot. For instance, one example of a safety means is an automatic-shut-off mechanism of the robot, which is coupled to logic circuitry, to ensure that the operation of the robot is discontinued if one of a number of contemplated possibilities takes place. For example, where a mobile robot is designed to dispense pesticide, if the amount of pesticide released by a mobile robot exceeds a threshold value as determined by the user, this may indicate a malfunction in the pesticide dispenser and the robot will automatically shut off to prevent further release of toxic pesticides.

In certain embodiments of the invention, the mobile robot comprises a pesticide dispenser. As the mobile robot traverses specified locations to which pests are attracted, the mobile robot dispenses pesticide at those locations to exterminate the pests.

In other embodiments, the mobile robot of the invention can include a means for effecting at least one capture of a pest that comes into contact with the robot. The means for effecting capture can include, but is not limited to, fabric covering (such as polyethylene cloth); adhesive; nets; mesh; toweling; loudspeaker grill cloth. In certain embodiments, attractants (such as attractants discussed herein) are also used to effect capture of pests.

In other embodiments of the invention, the capture means further comprises a pesticide or a means for exterminating the collected/captured pests. For example, the means for effecting capture can include an electrified mesh that is infused with a chemoattractant. Once a pest is attracted to the vicinity of the electrified mesh by the chemoattractant, a shock of electricity is released to exterminate the pest.

In one embodiment, where the capture effecting means is a cloth, the cloth has alternating colored stripes to create a visual contrast known to appeal to certain species of pests. Preferably, the stripes are straight, vertically oriented black and white stripes. Alternatively, a barber-pole orientation of stripes or an arrangement of spots may be used.

In yet a further embodiment, the cloth may comprise random strips of foil attached thereto for the purpose of breaking up the heat pattern emitted by the mobile robot. The random heat pattern helps to create the desired "thermal signature" of underlying muscles and viscera of the pest's prey.

As important as it is to attract ticks, it is also important to hold them in contact with the mobile robot as long as possible so as to maximize the efficacy of the treatment for extermination. For black-legged ticks, *I. scapularis*, a mixture of guanine and xanthine in the ratio of approximately 10:1 has been shown to serve as a potent arrestant (Sonenshine et al. 2003). Although specific for black-legged ticks, inclusion of these relatively inexpensive purines is worthwhile in view of the immense importance of the deer ticks in the transmission of the Lyme disease agent. Consequently, in addition to the two attractants noted above, 1-octen-3-ol and 2-nitrophenol, guanine and xanthine, in the ratio 10:1, will also be incorporated into the treatment applied to cloth coverings of the device.

Killing ticks captured by the mobile robot is best done by treating the cloth coverings of the device with the pyrethroid Permethrin (1%). Permethrin is a very stable compound and is widely used in commercial insecticide products. At the recommended dose (1%), it's use has been allowed by the EPA for treatment of livestock and wildlife.

In a preferred embodiment, the collection/pesticide-delivery cycle is accomplished by moving slowly along the path defined by the attractant/navigation tube. A navigational sensor circuit detects the distance of the robot from the wire in the tube. The magnetic signal produced by the wire induces sinusoidal voltages, inversely proportional to the distance from the wire, in two inductor-capacitor tank circuits tuned to the frequency of the signal. The tank circuits are located on each side of the center line of the robot, allowing for the determination of which side of the wire the robot is on and also allowing differential methods to be used for reducing common mode effects such as vertical distance from the wire. The two voltages are amplified and are detected by precision half-wave rectifiers. The resulting dc voltages are scaled and biased, and are provided to the microcontroller via its analog-to-digital interface.

Once the navigation signals are converted to digital form, the signals are preprocessed by the microcontroller to produce an error signal and error rate-of-change signal. These signals are used by a fuzzy-logic control algorithm implemented on the microcontroller to produce motor speed and steering controls to keep the robot moving along the attractant/navigation tube.

Obstacles that impede robot motion are sensed by motor current. If an obstacle event occurs or the robot deviates far enough from the path to lose the navigation signal, the microcontroller attempts to take corrective action by causing the robot to start a spiraling trajectory path until the signal is once again detected or a predetermined timing period expires. If the navigation signal is recaptured, the robot continues on the collection/pesticide-delivery cycle; otherwise, the microcontroller signals a distress state and shuts motion down to conserve power.

In one embodiment, the mobile robot captures and kills pests, such as ticks, that would otherwise have fed on animals or humans, thereby reducing the tick population. By attracting ticks to the navigation path (by means, for example, of $CO_2$ gas emanating from an attractant line), the efficacy of the robot is greatly enhanced. Each time the robot traverses its path, more and more ticks are collected and killed. Use of the devide beginning, for example, in the early spring, can lead to disruption of the larval and nymphal populations of ticks such as, for example, the dog tick *Dermacentor variabilis,* killing the immature stages before they can feed and molt to human-biting adults. Since *D. variabilis* is the vector of the agent of Rocky Mountain spotted fever, this reduces the risk of acquiring this disease. Similarly, by continuing activity during the late spring and summer periods, when immature stages of deer ticks (*Ixodes scapularis*) and lone star ticks (*Amblyomma americanum*) are active, this greatly reduces the risk to humans for acquiring Lyme diseases or human Ehrlichiosis.

Service Station

In one embodiment, the service station has components and mechanisms known to the skilled artisan for use in automated maintenance of a mobile robot. For example, the service station can include any one or combination of the following: a means for charging batteries on the mobile robot; a means for removal of pests and other detritus; a means for exterminating pests (such as using a pesticide); a means for replenishing a pesticide dispenser with pesticide; a means for replenishing the robot covering with pesticide; a means for replenishing the robot covering with chemoattractant; a means for sterilizing the robot (for example using shortwave UV radiation); and a means for providing housing for the navigation signal and attractant (such as $CO_2$) generation mechanisms.

In a preferred embodiment, the service station structure is an opaque housing with externally visible status indicators and auto-locking entrance and exit doors. A microcontroller directs its autonomous operation by sensing the entrance to the housing, identifying the robot, detecting connection to the charging electrodes and controlling the indicators, door locks, charging circuit, UV light source and pesticide aspiration pump.

In the service cycle, the robot enters the service station and stops when contact is made with battery charging electrodes. The service station activates when the robot is detected by entrance sensors, onboard identification sensors, and proper connections to the battery charging electrodes. An interlocking mechanism provides for safe operation by not allowing the station to function unless the robot has been properly identified. Once the robot is identified, the microcontroller can lock the entrance and exit doors to prevent human and/or animal exposure to means for sterilizing the robot (such as with shortwave UV light) and to energize the battery charging circuit of the robot.

Near the end of the charge cycle, the microcontroller enables the UV light source to sterilize the robot cover. When charging and sterilization are complete, the robot starts and moves to the exit passing though spring-loaded brushes for cleaning the cover. As the robot passes the brushes, microcontroller turns on a small aspiration pump that replenishes the cover with pesticide and unlocks the entrance and exit doors allowing the robot to begin the collection/pesticide-delivery cycle.

Chemoattractant

A variety of compounds have been found to be highly attractive to pests, ticks in particular. Among the most potent as well as universal are volatile chemoattractants such as $CO_2$ and $NH_3$. $CO_2$ is probably the best-known long range chemoattractant for ticks. Ticks can be aroused from their resting state by increases in the $CO_2$ concentration above ambient levels (Steullet, P. and P. M. Guerin, "Perception of breath components by the tropical bont tick *Amblyomma variegatum* Fabricius (Ixodidae)," *J. Comp. Physiol. A,* 170: 677-685 (1992)). For these ticks and many other species, $CO_2$ is a non-specific, general excitant. Once stimulated, the ticks respond to differences in the concentration gradient that leads them to the $CO_2$ source.

Host body odors from host skin and/or sweat are also potent attractants, although usually only at close range. An example is the blend of different compounds found in a phenolic fraction extracted from cattle. Two compounds in this extract, 1-octen-3-ol and 2-nitrophenol, both of which are characteristically found in bovine odors, evoked responses from cattle ticks, *Boophilus microplus* and the European sheep ticks, *Ixodes ricinus*. Both compounds evoke a significantly stronger response from *B. microplus* than *I. ricinus*. However, no single odorant was as attractive to the ticks as a blend simulating the natural host odors (Osterkamp et al., "Host-odour recognition in two tick species is coded in a blend of vertebrate volatiles," *J Comp Physiol.,* 185(1):59-67 (1999)). Ticks also detect $H_2S$ and there is evidence that receptors in the Haller's organ on the forelegs are very sensitive to this compound (Steullet & Guerin, 1992). Thus, a combination the organic volatiles 1-octen-3-ol and 2-nitrophenol and (in a weak alcoholic solution) can be used to treat the cloth coverings of the device. Applied to the cloth coverings of the robot (along with the pesticide) as it periodically traverses the service station, these potent attractants will enhance tick collection success.

Other forms of attractants that can be used to attract pests to a specific location of removal and/or extermination by the robotic means include, but are not limited to, light, hypoxanthine, xanthine, inosine, adenine, hematin, sex attractant pheromones (such as 2,6-dichlorophenol), octenol, and infrared light (light of certain wavelengths that are similar to those emitted by warm-blooded animals).

Any form of chemical compounds in a single point source or in multi-point sources can be used in the subject invention. Chemical compounds known to be attractants to pests can be dispensed in a variety of forms, such as granules, powders, liquids, gas, spray, etc.

Attractant line

In one embodiment, the attracting means of the invention is an attractant line that consists of a perforated plastic tube with an embedded, electrical wire (wherein the embedded wire is a means for navigating the robot). A chemoattractant such as $CO_2$ is pumped into the plastic, perforated tube by a $CO_2$ generator and is emitted into the atmosphere by the perforations. The $CO_2$ is a means for attracting pests, especially ticks, to gather in a narrow band of area surrounding the tube.

A sinusoidal electrical signal current of fixed frequency is injected on the wire, which creates a low-intensity magnetic field that is used by the robot to navigate the area where the pests are gathered (as the result of released chemoattractant). Where the robot is covered in a heavy cloth such as denim, the ticks will have the tendency to attach to the cloth where they are exposed to pesticide (either infused in the cloth or at a service station).

In certain embodiments where the attracting means is an attractant line, the attractant line serves as a means for navigating the mobile robot (like a rail on which the robot rides along).

Pesticides

Examples of pesticides useful in exterminating pests in accordance with the subject invention include, but are not limited to, propoxur, synthetic pyrethroids (such as permethrin, resmethrin, and deltamethrin), and organophosphorous compounds (such as derspan, diprom, and malthion). Preferred pesticides of the invention are those recognized as effective against pests but of relatively low toxicity to humans and animals.

The minimum quantity of pesticide will vary depending upon the pesticide chosen for use in accordance with the subject invention, the choice of carrier material to be placed about the robot, and/or the species of pest to be exterminated. In general, the concentration of the pesticide will fall in the range of 1% of pesticide per inch of material.

All patents, patent applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. An automated pest control method comprising:

attracting a pest to at least one pre-selected location by distributing a chemoattractant to said at least one pre-selected location utilizing a length of perforated tubing, said chemoattractant being selected from the group consisting of $CO_2$, 1-octen-3-ol, 2-nitrophenol, $H_2S$, hypoxanthine, xanthine, inosine, adenine, hematin, sex attractant pheromones, and octenol;

utilizing at least one mobile robotic mechanism, comprising a pesticide, that traverses a pre-determined path corresponding to the length of perforated tubing in order to monitor the pre-selected location(s); and delivering a pest controlling amount of a pesticide with the mobile robotic mechanism(s), such that a pest present at the pre-selected location(s) is exposed to a pest controlling amount of the pesticide.

2. The pest control method according to claim 1, wherein said pest is selected from the group consisting of: Nematodes (Nematoda); mites (Acari); spiders (Acarina); millipedes (Diplopoda); centipedes (Chilopoda); lice (Anoplura); wood lice (Isopoda); mosquitoes (Culicidae); blackflies (Simuliidae); sand flies (Phlebotominae); biting midges (Ceratopogonidae); horseflies (Tabanidae); termites (Isoptera); tsetse flies (Glossinidae); stable flies and house flies (Muscidae); fleas (Siphonaptera); triatomine bugs (Triatominae); soft ticks (Argasidae); and hard ticks (Ixodidae).

3. The pest control method according to claim 1, wherein said length of perforated tubing is positioned around the perimeter of an area in which a pest is to be controlled.

4. The pest control method according to claim 1, further comprising electrical wiring following substantially the same path as the perforated tubing.

5. The pest control method according to claim 4, wherein the at least one mobile robotic mechanism comprises sensors that detect a signal emitted by said electrical wiring such that the mobile robotic mechanism is guided by said sensors along substantially the same path as the electrical wiring.

6. The pest control method according to claim 1, wherein the at least one mobile robotic mechanism further comprises a covering to which a pest can adhere.

7. The pest control method, according to claim 6, wherein said covering is selected from the group consisting of polyethylene cloth, adhesive, nets, meshes, toweling, and loudspeaker grill cloth.

8. The pest control method, according to claim 7, wherein said covering further comprises an alternating stripe pattern or other visual contrast known to attract a pest.

9. The pest control method, according to claim 8, wherein said covering further comprises one or more chemoattractants.

10. The pest control method, according to claim 1, wherein said pesticide is pyrethroid permetlirin.

11. The pest control method, according to claim 1, wherein maintenance of the at least one mobile robotic mechanism is performed automatically at a service station, wherein said service station can receive and communicate with said mobile robotic mechanism.

* * * * *

UNITED STATES PATENT AND TRADEMARK OFFICE
CERTIFICATE OF CORRECTION

PATENT NO. : 7,441,367 B2
APPLICATION NO. : 11/374440
DATED : October 28, 2008
INVENTOR(S) : Squire et al.

Page 1 of 1

It is certified that error appears in the above-identified patent and that said Letters Patent is hereby corrected as shown below:

<u>Column 10,</u>
Line 21 "permetlirin" should read --permethrin--.

Signed and Sealed this

Third Day of March, 2009

JOHN DOLL
*Acting Director of the United States Patent and Trademark Office*